Feb. 5, 1924. Re. 15,753
E. RUUD
WATER HEATER
Original Filed May 6, 1912
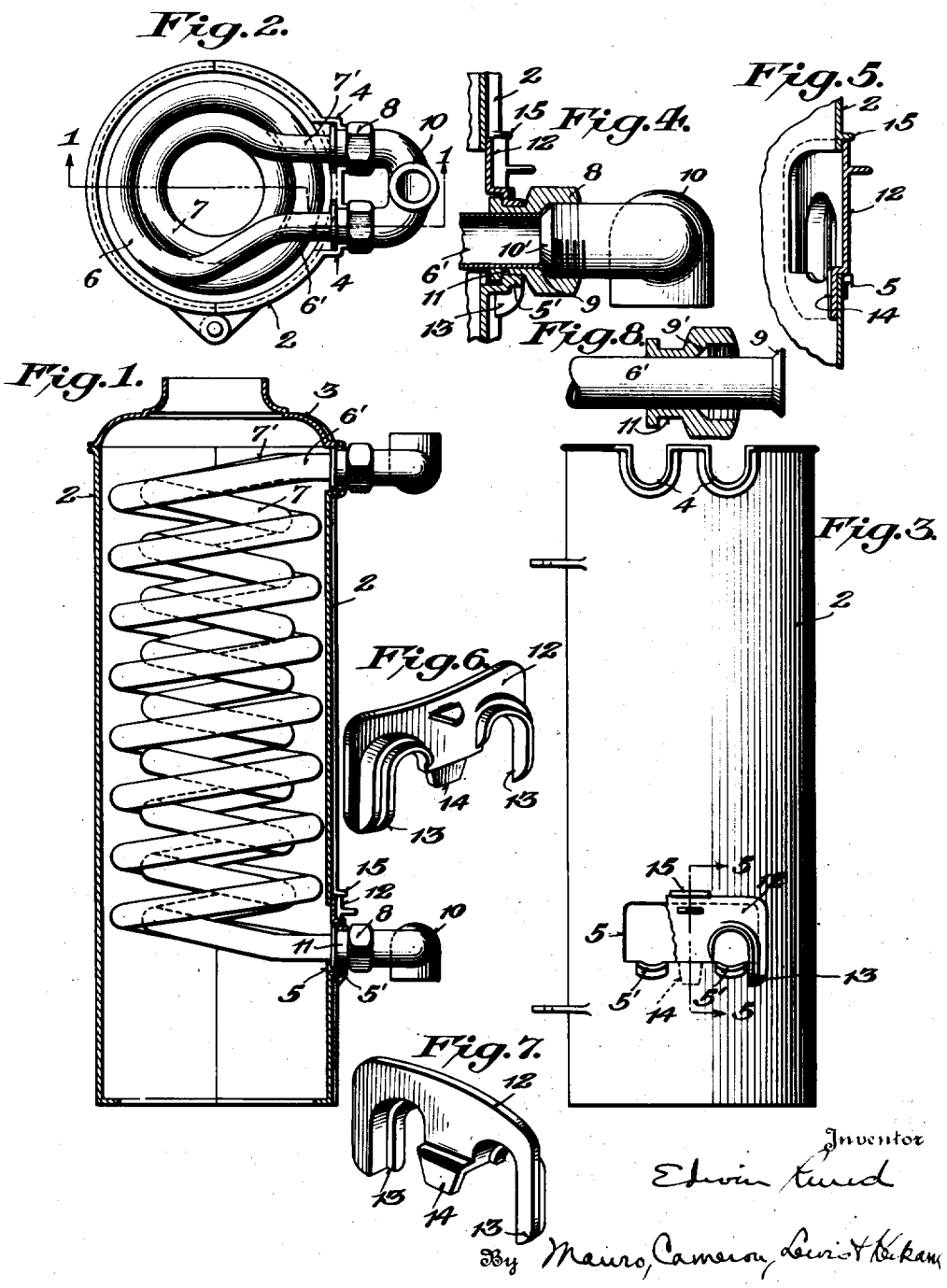
Inventor
Edwin Ruud
By Mauro, Cameron, Lewis & Dickam
Attorneys Reissued Feb. 5, 1924. Re. 15,753

UNITED STATES PATENT OFFICE

EDWIN RUUD, OF PITTSBURGH, PENNSYLVANIA, ASSIGNOR TO RUUD MANUFACTURING COMPANY, OF CAMDEN, NEW JERSEY, A CORPORATION OF NEW JERSEY.

WATER HEATER.

Original No. 1,050,564, dated January 14, 1913, Serial No. 695,431, filed May 6, 1912. Application for reissue filed November 22, 1922. Serial No. 602,646.

*To all whom it may concern:*

Be it known that I, EDWIN RUUD, a citizen of the United States of America, and a resident of Pittsburgh, Pennsylvania, have invented a new and useful Improvement in Water Heaters, which invention is fully set forth in the following specification.

Considerable trouble has been experienced with gas burning instantaneous water heaters due to the bending and mutilating of the relatively thin copper or other coils which are ordinarily supported by extending their unprotected extremities through openings in the casing and into position to connect with the circulating pipes, the weight of the coil bending and sometimes rupturing the thin metal extremities which bear on the comparatively thin metal of the casing. Also rough or careless manipulation by workmen when installing heaters and connecting the circulating pipes frequently results in bending and straining the coils. Furthermore, the vibrating or shaking of the coils when the heaters are being handled or shipped bends and strains their supporting extremities.

The object of the invention is to overcome these difficulties by relieving the coil extremities of all distorting strains, and by providing for permanently fixing the coils within the casing so that it is quite impossible for them to move or become displaced.

A further object is to so construct the casing that the coil or coils may be placed therein with the holding devices located on the coil extremities, in the preferred adaptation two coils being employed which are connected by manifolds at their upper and lower ends before being inserted in the casing.

In the accompanying drawings,

Fig. 1 is a vertical section of the casing and elevation of the coils of a water heater constructed in accordance with the invention, said view being taken on lines 1—1 of Fig. 2;

Fig. 2 is a top plan with the casing cap removed;

Fig. 3 is an elevation of the casing before the coils are positioned therein;

Fig. 4 is a vertical section through the lower extremity of one of the coils and its sustaining coupling;

Fig. 5 is a sectional detail of the holding device for the couplings at the lower extremities of the coils, taken on line 5—5 of Fig. 3; and Figs. 6 and 7 are views in perspective of said holding device; and Fig. 8 is a detail of one of the coil extremities before it is connected to a manifold.

Referring to the drawings, 2 designates the cylindrical two-part shell or casing of a gas heated coil water heater with a flue connecting cap 3 fitting its upper end. For the two-coil type of heater here shown the top edge of the casing is formed with the two seat-forming notches 4, which are preferably flanged as shown to provide bearing surfaces, and which are closed when cap 3 is in place. The lower portion of the casing is formed with an opening or passageway 5.

In the present adaptation two circulating coils 6 and 7 are located within the casing in nested relation, the coils being usually formed of relatively thin copper tubing. The coils are so arranged that their upper laterally projecting extremities 6′ and 7′, respectively, are in parallel relation, and the same is true of their lower extremities. On each extremity of each coil is a bushing or combined supporting and coupling nut 8 into which the coil end is extended with the extremity thereof flared outwardly at 9 against the beveled internal seat 9′ of the coupling, being clamped and sealed on the seat by the tapered extremity 10′ of manifold 10. One of these manifolds connects the two upper couplings 8 and another like manifold the two lower couplings, the circulating pipes connecting with these manifolds, as will be understood.

The exterior of each coupling nut 8 is grooved at 11 to fit notches 4 at the upper end of the casing, also seats 5′ of opening 5, being secured on the latter by the pronged or forked plate 12. This plate is curved to fit the exterior of casing 2 and is formed with two downwardly extending prongs 13, which engage the exterior of the casing, and the central inward offset prong 14 which engages the inner surface thereof, as shown in Fig. 5, prongs 13 being shaped to fit the coupling grooves 11. When in position, plate 12 is moved inwardly beneath stop 15 projecting from the casing which holds it in place. The coupling nuts may be placed loosely on the coil extremities before or after the coils are assembled, the bell or flare 9 preventing them from dropping off, see Fig. 8.

When, as in the present adaptation, two coils are employed having laterally projecting extremities, they are assembled or nested by a screw-like movement of one coil with reference to the other, thereby carrying the extremity of the inner coil through or between the convolutions of the outer coil until one is fully within the other.

With the coils assembled they are secured together by screwing up the couplings on manifolds 10, thereby sealing the connections between the manifolds and coils, as above described. The connected coils are then inserted in the casing, the couplings at the upper end seating in notches 4, and the manifold at the lower end is projected through casing opening 5, and its couplings are fixed on seats 5′. Casing 2 is then closed, cap 3 is applied, and locking plate 12 inserted, thereby rigidly securing the coils and their connections within the casing and so permanently and rigidly holding them that they cannot loosen or become displaced, at the same time protecting the thin metal tubing of the coils from distorting or denting strains. As the couplings are rigid with the casing, the latter relieves the coils of all strains that may occur when connecting the circulating pipes. Also, with the coils permanently held they are maintained in proper position relative to the burner and the ascending heat currents, incurring constant maximum efficiency.

What is claimed is:—

1. In a water heater, the combination of a casing having a plurality of openings in the lateral wall thereof, one of said openings being in the form of a notch in the upper edge of said wall, a coil of relatively thin tubing within the casing, combined coupling and supporting devices of tubular form engaging the ends of the coil and seated in said openings substantially at right angles to the longitudinal axis of said coil, water circulating connections at the exterior of the casing uniting with said devices, and means removably holding the devices seated in the casing openings, whereby said coil is supported in said casing by means of said devices.

2. In a water heater, the combination of a casing having openings therein, one of said openings being in the form of a notch in the upper edge of said wall, the casing adjacent the lower sides of said openings forming seats and the upper portions of said openings being adapted to admit coupling devices which rest on the seats, a coil of relatively thin metal within the casing, coupling devices at the extremities of the coil projected through the casing openings and resting in the seat-forming portions thereof, and means holding the couplings seated in said openings, the portions of the couplings at the exterior of the casing being adapted to unite with water circulating connections.

3. In a water heater, the combination of a casing provided with an opening with a seat formed by the wall of such opening, a coil of pipe within the casing, and an exteriorly grooved coil supporting device to which the coil is connected, said device entered in the casing opening and with the exterior thereof embracing the seat-forming portion of the opening wall for retaining said device against either inward or outward movement.

4. In a water heater, the combination of a casing provided with an opening, a coil of pipe within the casing, a coupling at an extremity of the coil, the coupling being grooved exteriorly and adapted to extend through the casing opening, and removable means entered in the coupling groove for holding the coupling in position on the casing.

5. In a water heater, the combination of a casing having an opening in the lateral wall thereof, nested coils of pipe within the casing having two of its ends in registry with said opening, a manifold, couplings adapted to detachably connect said ends to said manifold and secure said ends to the lateral wall of the casing, thereby preventing relative displacement of the assembled parts, and means for removably confining said couplings in said opening.

6. In a water heater, the combination of an upright casing having vertically separated openings in the lateral wall thereof, a coil of pipe within the casing having its opposite ends in registry with said openings, supporting couplings, one for each end of said coil, positioned in said openings, and manifolds engaging said couplings and rigidly securing the ends of said coil to said couplings.

7. In a water heater, the combination of an upright casing having vertically separated openings in the lateral walls thereof, a coil of pipe within the casing having its opposite ends extending substantially at right angles to the longitudinal axis of said coil, couplings engaging the ends of said coil and forming continuations thereof, and means holding the couplings removably fixed in the casing openings, said couplings being adapted to support said coil in said casing.

8. In a water heater, the combination of an upright casing provided with vertically separated openings in the lateral walls thereof, one of said openings being in the form of a notch in the upper edge of said wall, two upright coils in the casing—one coil within the other, the ends of said coils extending substantially parallel one with the other at substantially right angles to the longitudinal axes of said coils, supporting couplings at the upper and lower extremities of the coils, and means removably securing the couplings within the casing openings.

9. In a water heater, the combination of an upright casing open at the top and notched downwardly to receive a coupling, the lower portion of the casing formed with an opening through which a coupling is adapted to pass, a coil of pipe within the casing, couplings at the upper and lower extremities of the coil with the upper coupling adapted to fit the casing notch and the lower coupling adapted to extend through the opening in the lower portion of the casing, means for securing said lower coupling to the casing, and a cap fitting the upper end of the casing.

10. In a water heater, the combination of a casing having two openings which form coupling seats, the lower portion of the casing formed with an opening, two coils in the casing—one coil within the other, couplings at the upper extremities of the coils adapted to fit the seat-forming openings, a manifold connecting the upper couplings, couplings at the lower extremities of the coils with the couplings extending through the casing passageway, a manifold connecting the lower couplings, and means for removably securing the lower couplings in the casing opening.

11. In a water heater, the combination of a casing, coils of pipe therein, connections extending through the casing for the upper ends of the coils, the lower portion of the casing formed with an opening, exteriorly grooved couplings at the lower extremities of the coils with the couplings extending through said opening, and a holding device engaging the grooved couplings and removably secured to the casing for holding the couplings within said opening.

12. In a water heater, the combination of a casing, coils of pipe therein, connections extending through the casing for the upper ends of the coils, the lower portion of the casing formed with an opening, exteriorly grooved couplings extending through said opening, and a pronged holding device embracing the grooved couplings with one prong thereof entered in the opening and engaging the inner surface of the casing and two prongs thereof engaging the exterior of the casing.

13. In a water heater, the combination of a casing, a plurality of relatively thin walled coils within said casing having the ends thereof extending substantially at right angles to the longitudinal axes of said coils, a plurality of couplings, one for each end of each of said coils, engaging the ends of the coils and projecting through the lateral wall of said casing, a manifold engaging a pair of adjacent couplings, and means removably securing said couplings to said walls, said coils being supported in said casing by said couplings.

14. In a water heater, the combination of a casing having vertically separated openings in the lateral wall thereof, a coil in said casing having the opposite ends thereof extending substantially at right angles to the longitudinal axis of said coil, the ends of said coil being flanged at their extremity, couplings, one for each end of said coil, having a seat interiorly thereof for the flanged end of said coil, manifolds threaded into said couplings for rigidly securing the flanged ends of said coil within said couplings, and means detachably securing said couplings in said openings.

15. In a water heater, the combination of a casing having two openings which form coupling seats, the lower portion of the casing formed with an opening, said openings being formed in the lateral walls of said casing, two coils in the casing—one coil within the other, couplings at the upper extremities of the coils adapted to fit the seat-forming openings, a manifold connecting the upper couplings, couplings at the lower extremities of the coils with the couplings extending through the casing passageway, a manifold connecting the lower couplings, and means for removably securing the lower couplings in the casing opening.

16. In a water heater, a casing having vertical walls with a plurality of seat-forming notches in the upper edge portion thereof and an opening vertically beneath said notches, in combination with a multiple coil within said casing with the ends of the coils extending at right angles to the axis of the coil, couplings on said ends seated respectively in said seat-forming notches and said opening, a cap secured to the top of said casing and holding said couplings in said seat-forming notches, and means retaining the lower couplings firmly in position in said opening.

17. In a water heater, a casing having seat-forming notches in the upper edge portion thereof and an opening through the casing in a plane below said notches, a plurality of coils within said casing with the ends of the coils projecting at a substantial angle to the wall of said casing, couplings on the ends of said coils, said couplings being provided with annular grooves, a cap secured to the top of said casing and having a lug portion engaging in the annular grooves of the upper couplings, and a removable forked plate straddling the couplings on the lower ends of the coils and provided with shoulders engaging the grooves in said couplings, said forked plate having a portion engaging the inner surface of the casing and a portion engaging the outer surface of the casing, whereby said coils are removably secured in firm position within the casing.

18. In a water heater, the combination of a casing provided with a seat-forming notch in its upper portion and a seat-forming opening in the lower portion thereof, a coil having its ends projecting at right angles to the axis of said casing, couplings on the upper and the lower end of said coil, each of said couplings being provided with an annular groove engaged by seat-forming portions of said notch and said opening, means removably secured to said casing and engaging the annular groove of the upper couplings, and removable means having a portion engaging the annular groove in said lower couplings, whereby the coil is firmly secured in position within said casing.

In testimony whereof I have signed this specification.

EDWIN RUUD.